(12) United States Patent
Khoshnevisan et al.

(10) Patent No.: US 11,159,270 B2
(45) Date of Patent: Oct. 26, 2021

(54) SEPARATELY COMMUNICATING DEMODULATION REFERENCE SIGNAL-BASED CHANNEL INFORMATION FOR MULTIPLE TRANSMIT RECEIVE POINTS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 98 days.

(21) Appl. No.: 16/664,361

(22) Filed: Oct. 25, 2019

(65) Prior Publication Data
US 2020/0153543 A1    May 14, 2020

Related U.S. Application Data

(60) Provisional application No. 62/757,326, filed on Nov. 8, 2018.

(51) Int. Cl.
*H04L 1/00*         (2006.01)
*H04L 5/00*         (2006.01)
(Continued)

(52) U.S. Cl.
CPC ......... *H04L 1/0036* (2013.01); *H04B 7/0632* (2013.01); *H04L 1/0026* (2013.01);
(Continued)

(58) Field of Classification Search
CPC ... H04L 1/0036; H04L 1/0026; H04L 5/0048; H04L 27/2649; H04B 7/0632; H04W 72/042
See application file for complete search history.

(56) References Cited

U.S. PATENT DOCUMENTS 6,259,927 B1 *   7/2001  Butovitsch ............. H04B 7/005
2012/0163335 A1 * 6/2012  Chung ................... H04W 72/04
(Continued)

OTHER PUBLICATIONS

Partial International Search Report—PCT/US2019/058321—ISA/EPO—dated Jan. 27, 2020.
(Continued)

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive demodulation reference signal (DMRS) information that indicates a first DMRS configuration for a first transmit receive point (TRP) and a second DMRS configuration for a second TRP; generate a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration; and transmit the first DMRS-based channel quality report and the second DMRS-based channel quality report. Numerous other aspects are provided.

30 Claims, 11 Drawing Sheets

(51) Int. Cl.
    *H04L 27/26*     (2006.01)
    *H04B 7/06*     (2006.01)
    *H04W 72/04*     (2009.01)

(52) U.S. Cl.
    CPC ........ *H04L 5/0048* (2013.01); *H04L 27/2649* (2013.01); *H04W 72/042* (2013.01)

(56) References Cited

U.S. PATENT DOCUMENTS

| | | |
|---|---|---|
| 2015/0078190 A1 | 3/2015 | Cheng et al. |
| 2015/0263796 A1 | 9/2015 | Nam et al. |
| 2016/0028448 A1* | 1/2016 | Park .................... H04B 7/0639 |
| 2017/0208572 A1 | 7/2017 | Park et al. |
| 2017/0237535 A1 | 8/2017 | Park et al. |
| 2018/0227886 A1* | 8/2018 | Chou .................. H04W 72/042 |
| 2020/0162134 A1* | 5/2020 | Kakishima ........... H04B 7/0417 |
| 2020/0169376 A1* | 5/2020 | Gao ...................... H04W 24/08 |
| 2020/0213070 A1* | 7/2020 | Guo ........................... H04I 5/10 |

OTHER PUBLICATIONS

International Search Report and Written Opinion—PCT/US2019/058321—ISA/EPO—dated Apr. 23, 2020.

* cited by examiner

SEPARATELY COMMUNICATING DEMODULATION REFERENCE SIGNAL-BASED CHANNEL INFORMATION FOR MULTIPLE TRANSMIT RECEIVE POINTS

CROSS-REFERENCE TO RELATED APPLICATION

This application claims priority to U.S. Provisional Patent Application No. 62/757,326, filed on Nov. 8, 2018, entitled "SEPARATELY COMMUNICATING DEMODULATION REFERENCE SIGNAL-BASED CHANNEL INFORMATION FOR MULTIPLE TRANSMIT RECEIVE POINTS," which is hereby expressly incorporated by reference herein.

TECHNICAL FIELD

Aspects of the technology described below generally relate to wireless communication and to techniques and apparatuses for separately communicating demodulation reference signal (DMRS)-based channel information for multiple transmit receive points (TRPs). Some techniques and apparatuses described herein enable and provide wireless communication devices and systems configured for low latency scenarios, high reliability scenarios, and/or enhanced network coverage.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code-division multiple access (CDMA) systems, time-division multiple access (TDMA) systems, frequency-division multiple access (FDMA) systems, orthogonal frequency-division multiple access (OFDMA) systems, single-carrier frequency-division multiple access (SC-FDMA) systems, time division synchronous code-division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include receiving demodulation reference signal (DMRS) information that indicates a first DMRS configuration for a first transmit receive point (TRP) and a second DMRS configuration for a second TRP; generating a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration; and transmitting the first DMRS-based channel quality report and the second DMRS-based channel quality report.

In some aspects, a UE for wireless communication may include memory and one or more processors operatively coupled to the memory. The memory and the one or more processors may be configured to receive demodulation reference signal (DMRS) information that indicates a first DMRS configuration for a first transmit receive point (TRP) and a second DMRS configuration for a second TRP; generate a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration; and transmit the first DMRS-based channel quality report and the second DMRS-based channel quality report.

In some aspects, a non-transitory computer-readable medium may store one or more instructions for wireless communication. The one or more instructions, when executed by one or more processors of a UE, may cause the one or more processors to receive demodulation reference signal (DMRS) information that indicates a first DMRS configuration for a first transmit receive point (TRP) and a second DMRS configuration for a second TRP; generate a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration; and transmit the first DMRS-based channel quality report and the second DMRS-based channel quality report.

In some aspects, an apparatus for wireless communication may include means for receiving demodulation reference signal (DMRS) information that indicates a first DMRS configuration for a first transmit receive point (TRP) and a second DMRS configuration for a second TRP; means for generating a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration; and means for transmitting the first DMRS-based channel quality report and the second DMRS-based channel quality report.

In some aspects, a method of wireless communication, performed by a base station, may include transmitting demodulation reference signal (DMRS) information that indicates a first DMRS configuration for a first transmit receive point (TRP), wherein the first DMRS configuration is different from a second DMRS configuration for a second TRP; transmitting a first set of DMRS according to the first DMRS configuration, wherein the first set of DMRS are different from a second set of DMRS transmitted according to the second DMRS configuration; and receiving at least one of a first DMRS-based channel quality report, generated based at least in part on the first set of DMRS, or a second DMRS-based channel quality report generated based at least in part on the second set of DMRS.

In some aspects, a base station for wireless communication may include memory and one or more processors operatively coupled to the memory. The memory and the one or more processors may be configured to transmit demodulation reference signal (DMRS) information that indicates a first DMRS configuration for a first transmit receive point (TRP), wherein the first DMRS configuration is different from a second DMRS configuration for a second TRP; transmit a first set of DMRS according to the first DMRS configuration, wherein the first set of DMRS are different from a second set of DMRS transmitted according to the second DMRS configuration; and receive at least one of a first DMRS-based channel quality report, generated based at least in part on the first set of DMRS, or a second DMRS-based channel quality report generated based at least in part on the second set of DMRS.

In some aspects, a non-transitory computer-readable medium may store one or more instructions for wireless communication. The one or more instructions, when executed by one or more processors of a base station, may cause the one or more processors to transmit demodulation reference signal (DMRS) information that indicates a first DMRS configuration for a first transmit receive point (TRP), wherein the first DMRS configuration is different from a second DMRS configuration for a second TRP; transmit a first set of DMRS according to the first DMRS configuration, wherein the first set of DMRS are different from a second set of DMRS transmitted according to the second DMRS configuration; and receive at least one of a first DMRS-based channel quality report, generated based at least in part on the first set of DMRS, or a second DMRS-based channel quality report generated based at least in part on the second set of DMRS.

In some aspects, an apparatus for wireless communication may include means for transmitting demodulation reference signal (DMRS) information that indicates a first DMRS configuration for a first transmit receive point (TRP), wherein the first DMRS configuration is different from a second DMRS configuration for a second TRP; means for transmitting a first set of DMRS according to the first DMRS configuration, wherein the first set of DMRS are different from a second set of DMRS transmitted according to the second DMRS configuration; and means for receiving at least one of a first DMRS-based channel quality report, generated based at least in part on the first set of DMRS, or a second DMRS-based channel quality report generated based at least in part on the second set of DMRS.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the aspects disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
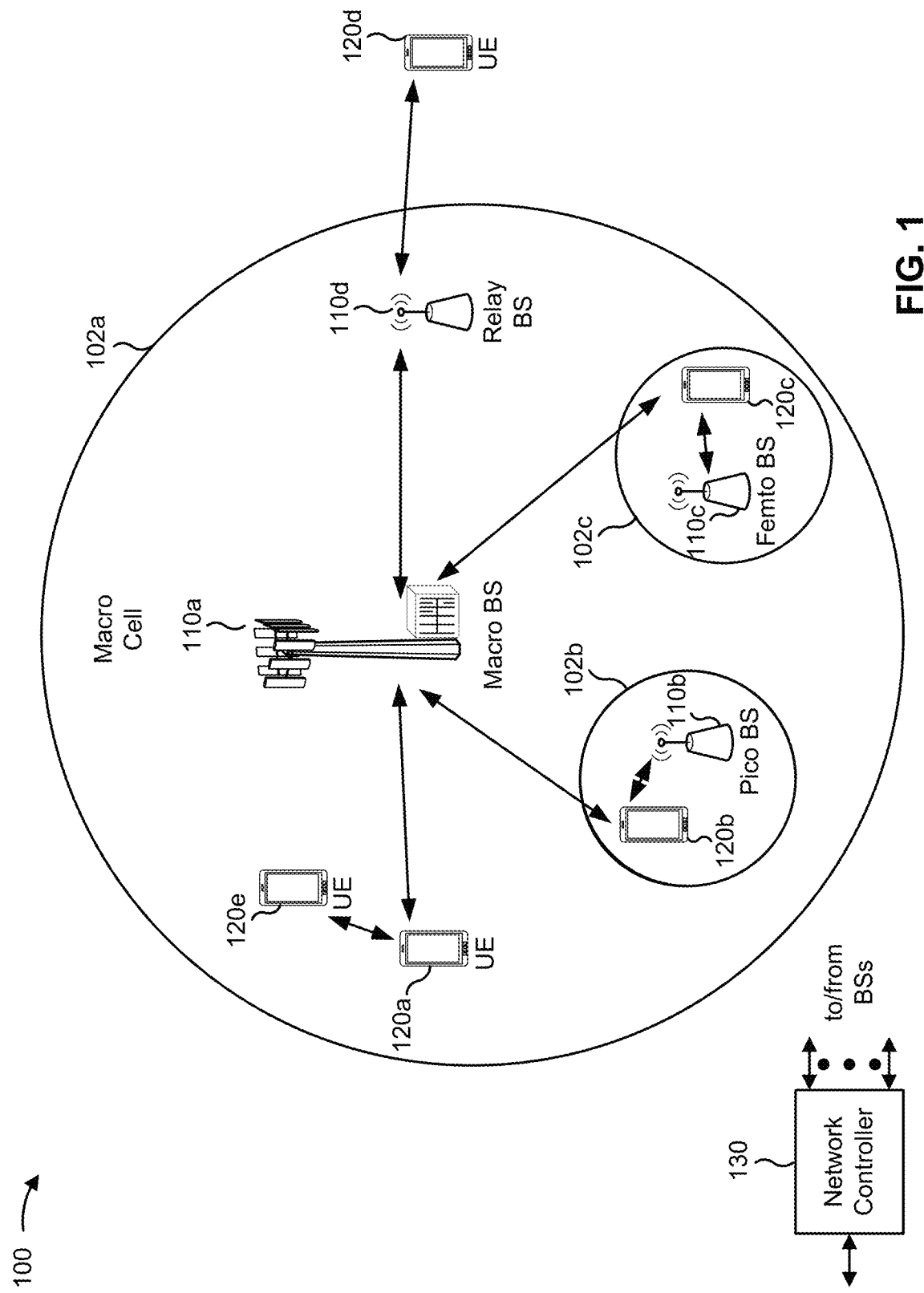
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc., of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscriptions. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as the Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
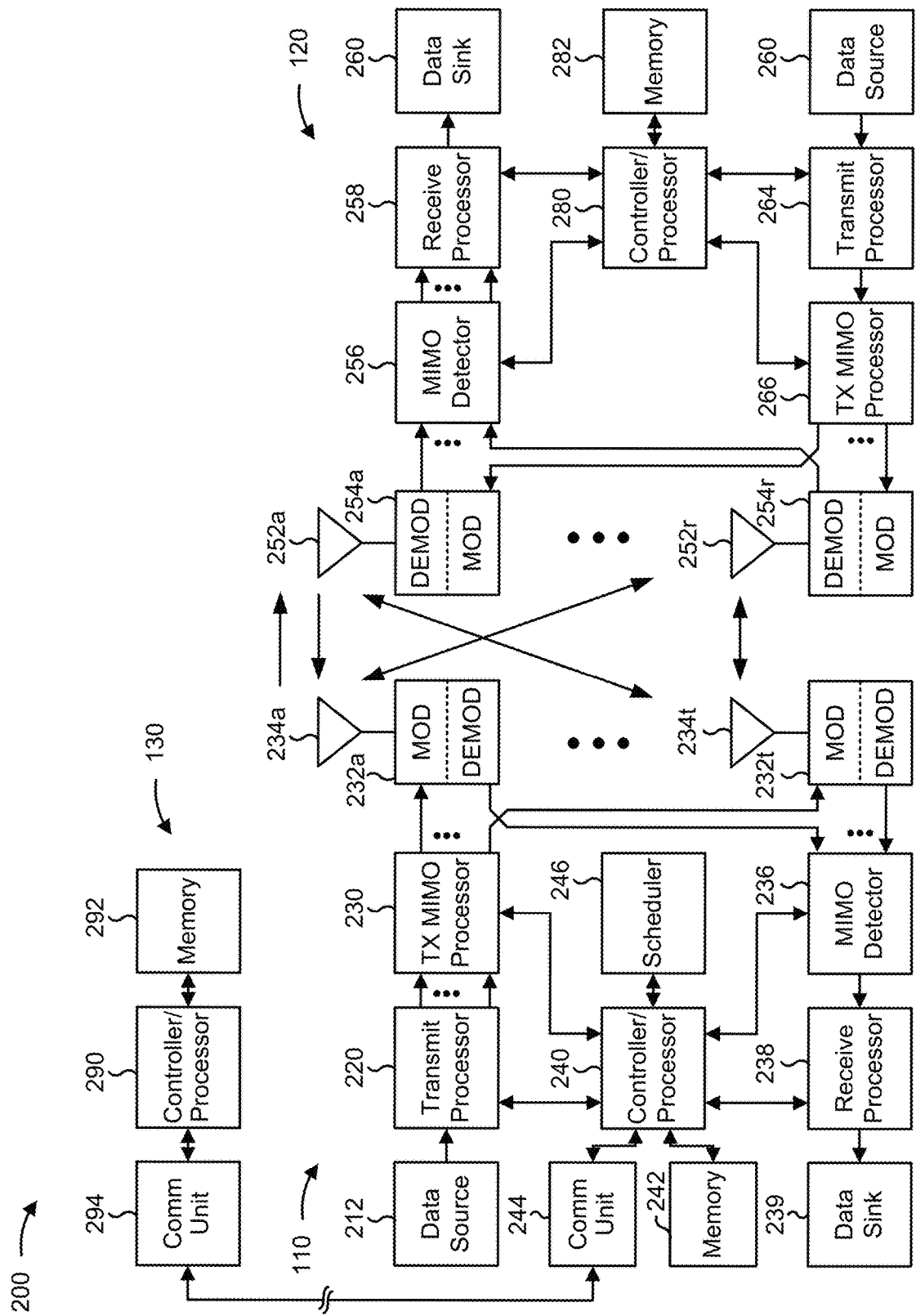
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with separately communicating DMRS-based channel information for multiple TRPs, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving demodulation reference signal (DMRS) information that indicates a first DMRS configuration for a first transmit receive point (TRP) and a second DMRS configuration for a second TRP; means for generating a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration; means for transmitting the first DMRS-based channel quality report and the second DMRS-based channel quality report; and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, base station 110 may include means for transmitting demodulation reference signal (DMRS) information that indicates a first DMRS configuration for a first transmit receive point (TRP), wherein the first DMRS configuration is different from a second DMRS configuration for a second TRP; means for transmitting a first set of DMRS according to the first DMRS configuration, wherein the first set of DMRS are different from a second set of DMRS transmitted according to the second DMRS configuration; means for receiving at least one of a first DMRS-based channel quality report, generated based at least in part on the first set of DMRS, or a second DMRS-based channel quality report generated based at least in part on the second set of DMRS; and/or the like. In some aspects, such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples may differ from what is described with regard to FIG. 2.

Figure 3:
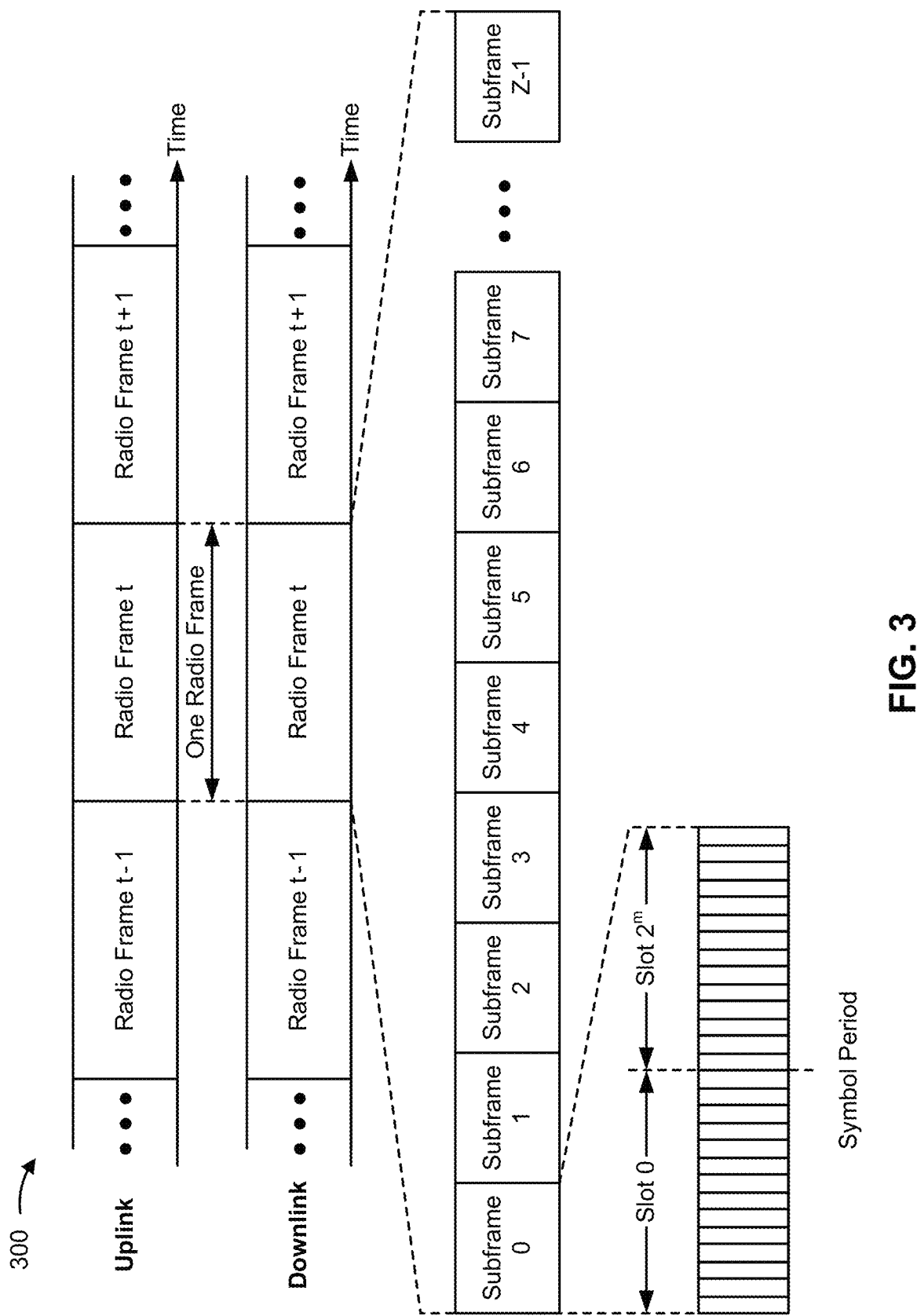
FIG. 3 is a block diagram conceptually illustrating an example of a frame structure in a wireless communication network, in accordance with various aspects of the present disclosure.

FIG. 3 shows an example frame structure 300 in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a slot may include one or more mini-slots. A mini-slot may include a number of symbols (e.g., 2 symbols, 3 symbols, 4 symbols, and/or the like) capable of being scheduled as a unit. In some aspects, a scheduling unit may be frame-based, subframe-based, slot-based, mini-slot based, symbol-based, and/or the like.

While some techniques are described herein in connection with frames, subframes, slots, min-slots, and/or the like, these techniques may equally apply to other types of wireless communication structures or transmission time intervals (TTIs), which may be referred to using terms other than "frame," "subframe," "slot," "mini-slot," and/or the like in 5G NR. In some aspects, a wireless communication structure or a TTI may refer to a periodic time-bounded communication unit defined by a wireless communication standard and/or protocol. Additionally, or alternatively, different configurations of wireless communication structures and/or TTIs than those shown in FIG. 3 may be used.

As indicated above, FIG. 3 is provided as an example. Other examples may differ from what is described with regard to FIG. 3.

Figure 4:
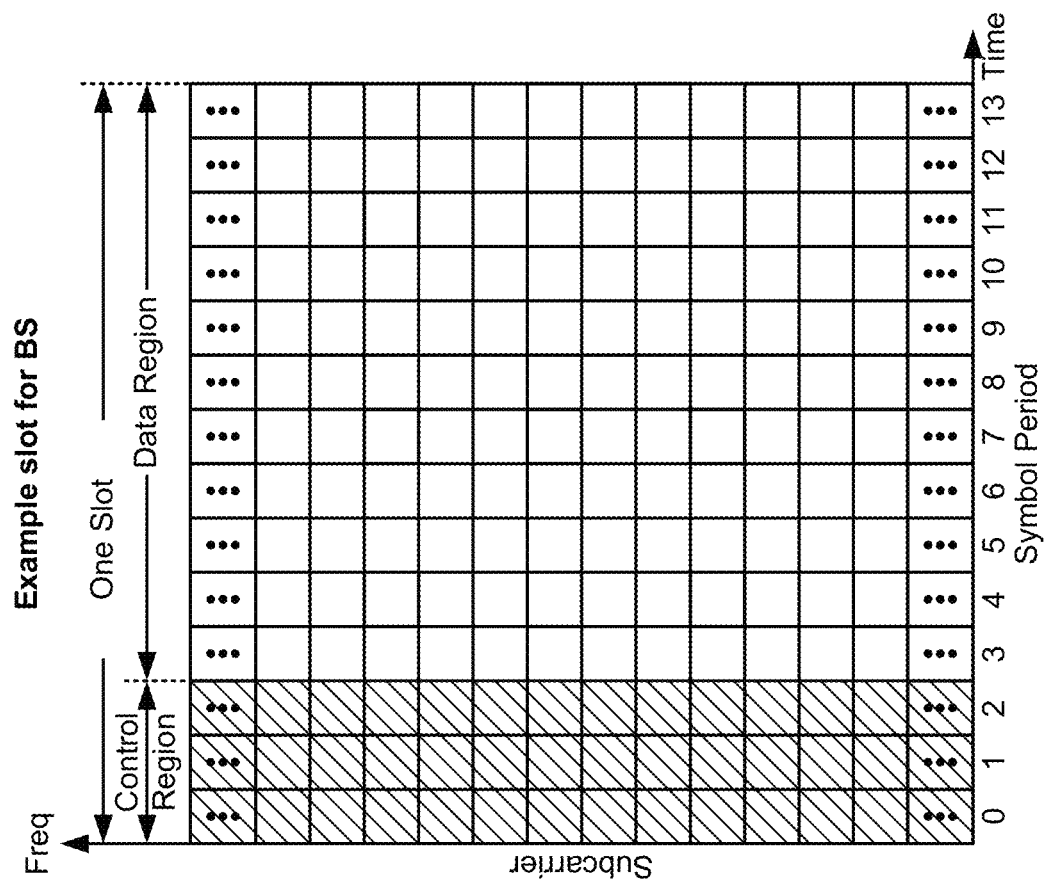
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
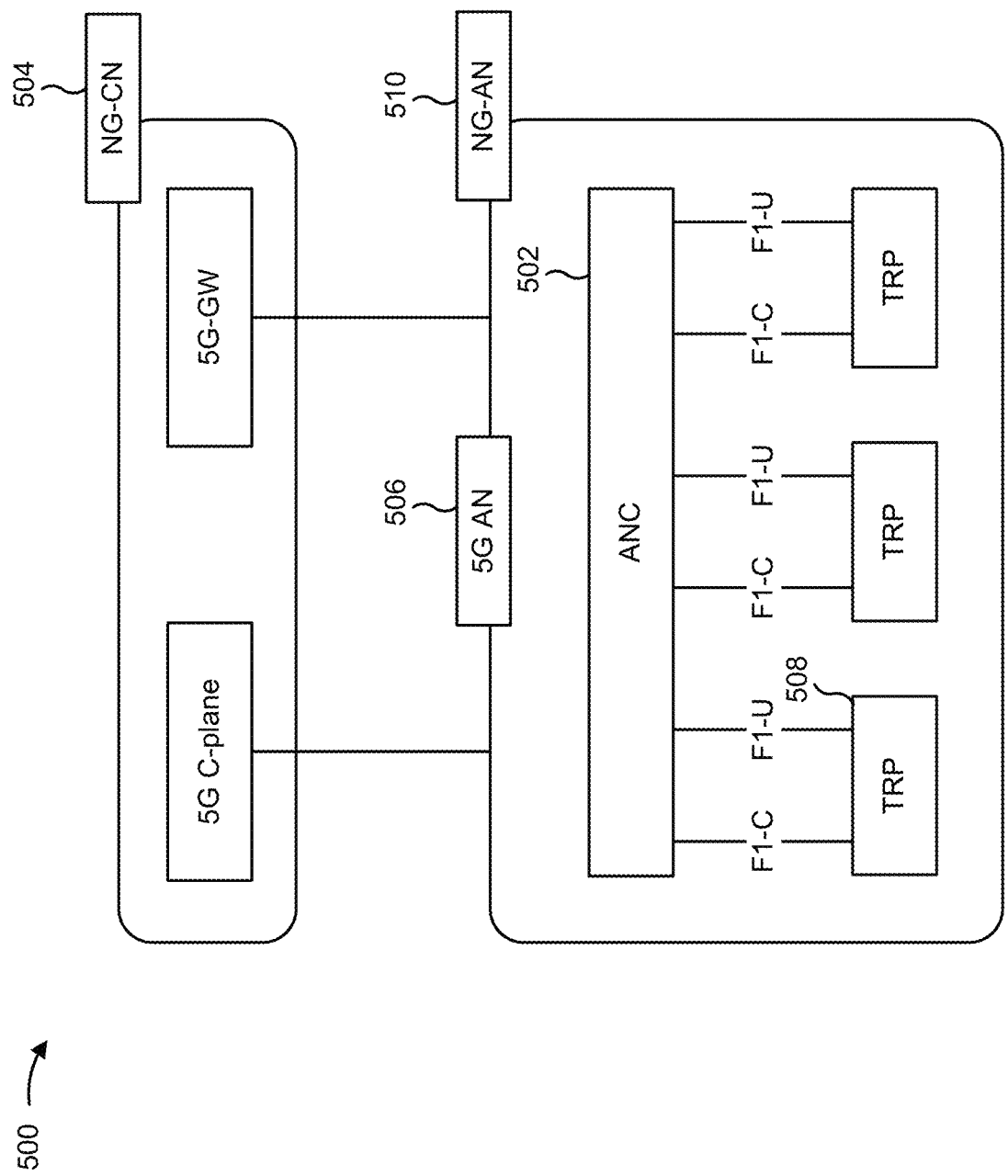
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure.

A 5G access node 506 may include an access node controller (ANC) 502. The ANC 502 may be a central unit (CU) of the distributed RAN 500. The backhaul interface to the next generation core network (NG-CN) 504 may terminate at the ANC 502. The backhaul interface to neighboring next generation access nodes (NG-ANs) may terminate at the ANC 502. The ANC 502 may include one or more TRPs 508 (which may also be referred to as BSs, NR BSs, Node Bs, 5G NBs, APs, gNB, or some other term). As described above, a TRP 508 may be used interchangeably with "cell." In some aspects, multiple TRPs 508 may be included in a single base station 110. Additionally, or alternatively, different TRPs 508 may be included in different base stations 110.

A TRP 508 may be a distributed unit (DU). A TRP 508 may be connected to a single ANC 502 or multiple ANCs 502. For example, for RAN sharing, radio as a service (RaaS), and service specific AND deployments, the TRP 508 may be connected to more than one ANC 502. A TRP 508 may include one or more antenna ports. The TRPs 508 may be configured to individually (e.g., using dynamic selection) or jointly (e.g., using joint transmission) serve traffic to a UE 120.

In some aspects, multiple TRPs 508 may transmit communications (e.g., the same communication or different communications) in the same TTI or different TTIs (e.g., slots, mini-slots, and/or the like) using different spatial parameters (e.g., different quasi co-location (QCL) parameters, different transmission configuration indication (TCI) states, different precoding parameters, different beamforming parameters, and/or the like).

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 510 may support dual connectivity with NR. The NG-AN 510 may share a common fronthaul for LTE and NR. The architecture may enable cooperation between and among TRPs 508. For example, cooperation may be preset within a TRP 508 and/or across TRPs 508 via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), media access control (MAC) protocol, and/or the like may be adaptably placed at the ANC 502 or TRP 508. According to various aspects, a base station 110 may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
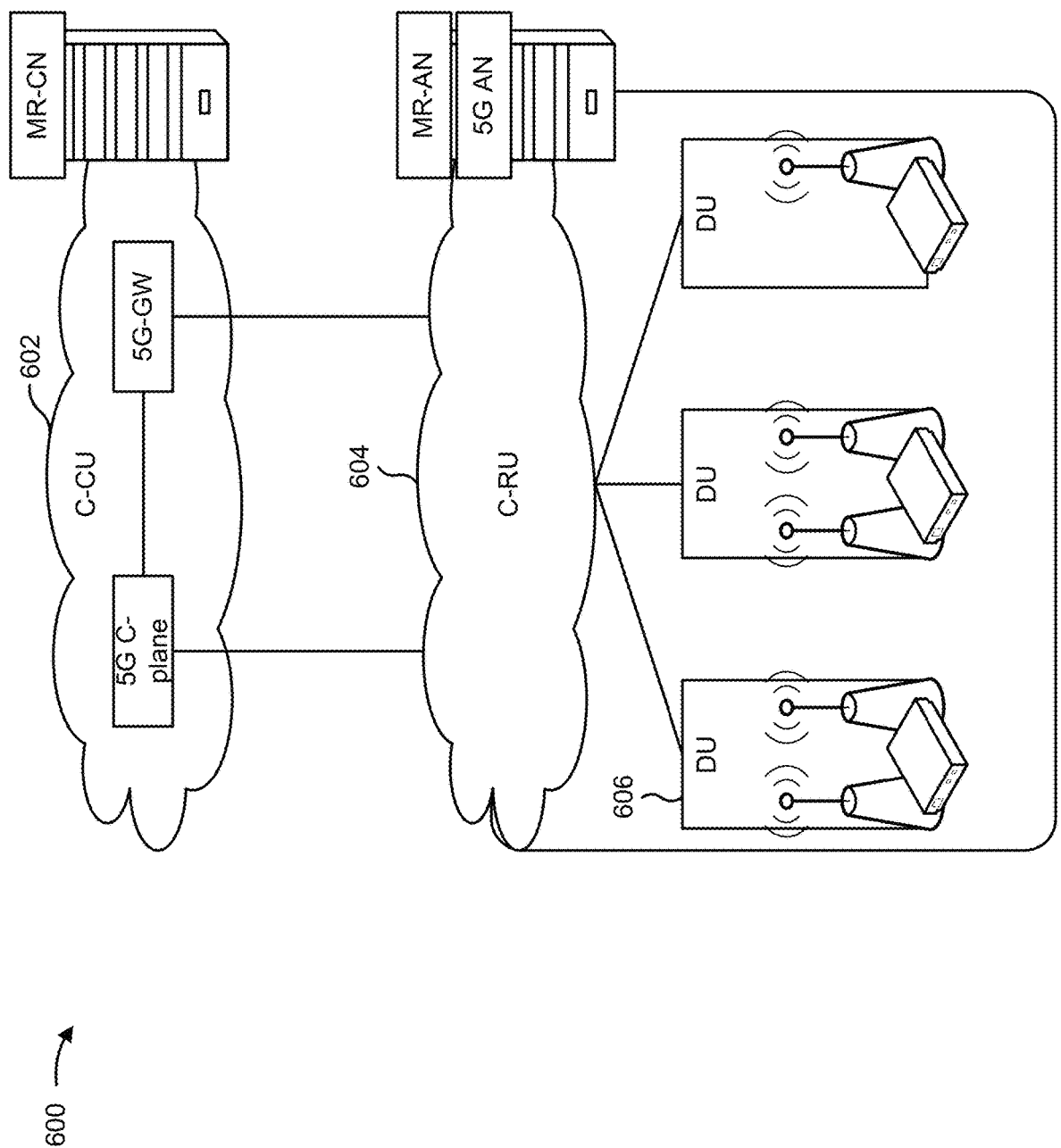
FIG. 6 illustrates an example physical architecture of a distributed RAN, in accordance with various aspects of the present disclosure.

FIG. 6 illustrates an example physical architecture of a distributed RAN 600, according to aspects of the present disclosure.

A centralized core network unit (C-CU) 602 may host core network functions. The C-CU 602 may be centrally deployed. Functionality of the C-CU 602 may be offloaded (e.g., to advanced wireless services (AWS)), in an effort to handle peak capacity. A centralized RAN unit (C-RU) 604 may host one or more ANC functions. In some aspects, the C-RU 604 may host core network functions locally. In some aspects, the C-RU 604 may have distributed deployment. A distributed unit (DU) 606 may host one or more TRPs 508. The DU 406 may be located at edges of the network with radio frequency (RF) functionality.

As indicated above, FIG. 6 is provided merely as an example. Other examples may differ from what is described with regard to FIG. 6.

Figure 7:
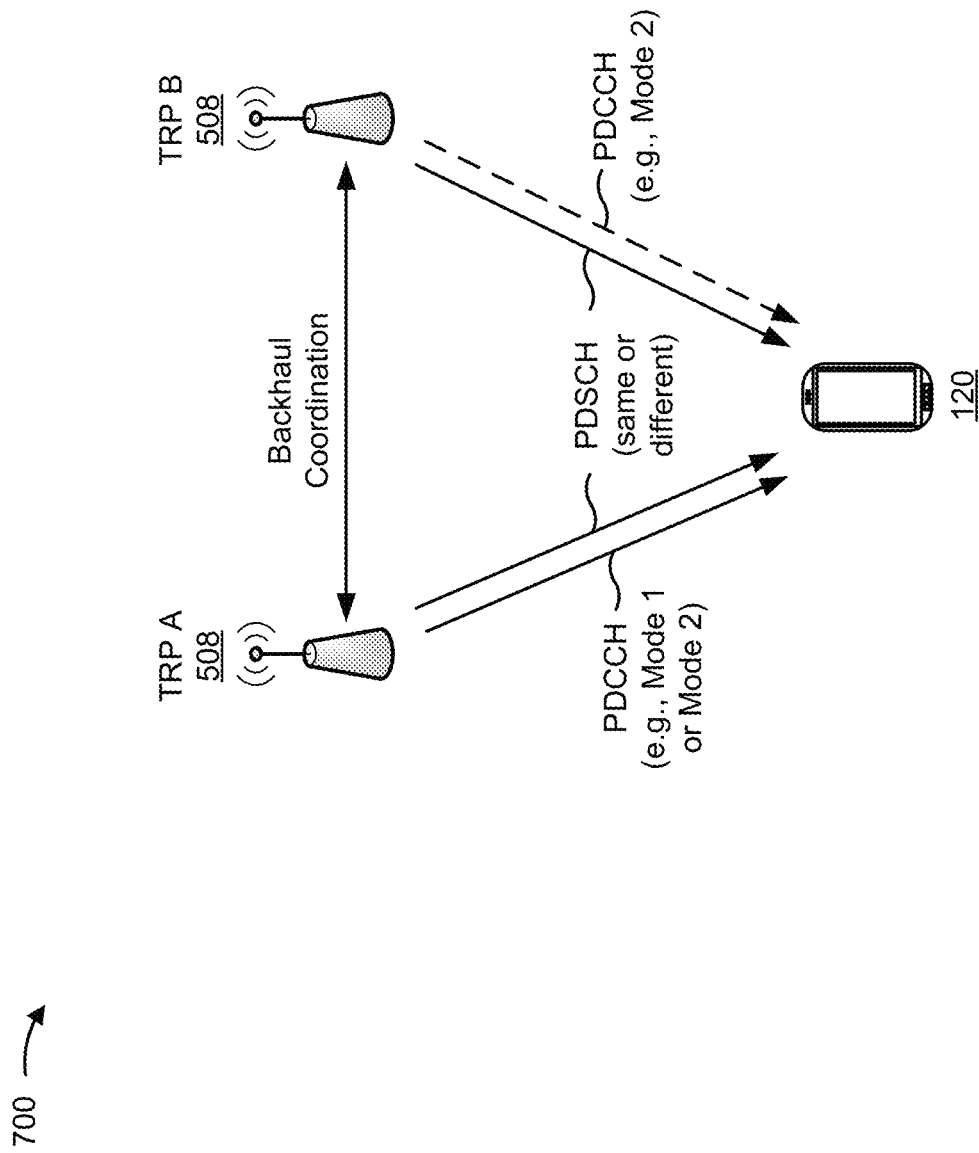
FIG. 7 is a diagram illustrating an example of multi-TRP communication, in accordance with various aspects of the present disclosure.

FIG. 7 is a diagram illustrating an example 700 of multi-TRP communication, in accordance with various aspects of the present disclosure.

As shown in FIG. 7, multiple TRPs 508 (shown as TRP A and TRP B) may communicate with the same UE 120 in a coordinated manner (e.g., using coordinated multipoint transmissions and/or the like) to improve reliability, increase throughput, and/or the like. The TRPs 508 may coordinate such communications via a backhaul, which may have a smaller delay and/or higher capacity when the TRPs 508 are co-located at the same base station 110 (e.g., different antenna arrays of the same base station 110), or may have a larger delay and/or lower capacity (as compared to co-location) when the TRPs 508 are located at different base stations 110.

For example, in a first multi-TRP transmission mode (e.g., Mode 1), a single physical downlink control channel (PDCCH) may be used to schedule downlink data communications for a single physical downlink shared channel (PDSCH). In this case, multiple TRPs 508 (e.g., TRP A and TRP B) may transmit communications to the UE 120 on the same PDSCH. In some aspects, different TRPs 508 may transmit in different (e.g., disjoint) sets of resource blocks (RBs) (e.g., for a frequency-division multiplexing (FDM) scheme where different sets of RBs correspond to different TCI states) and/or different sets of symbols/slots (e.g., for a time-division multiplexing (TDM) scheme where different sets of symbols/slots correspond to different TCI states). Additionally, or alternatively, different TRPs 508 may transmit using different sets of layers (e.g., different multiple input multiple output (MIMO) layers), such as for a spatial-division multiplexing (SDM) scheme where different sets of layers correspond to different TCI states. In some aspects, transmissions on different layers may occur in overlapping resource blocks and/or overlapping symbols (e.g., may overlap in time and/or frequency, may occur in the same resource element or different resource elements, and/or the like). As another example, in a second multi-TRP transmission mode (e.g., Mode 2), multiple PDCCHs may be used to schedule downlink data communications for multiple corresponding PDSCHs (e.g., one PDCCH for each PDSCH).

To allow a base station 110 (e.g., one or more TRPs 508) to modify communications to compensate for changing channel conditions (e.g., by selecting a different modulation and coding scheme (MCS), a different transport block size, and/or the like), the UE 120 may transmit channel state information (CSI) to the base station 110, such as a precoding matrix indicator (PMI), a rank indicator (RI), a channel quality indicator (CQI), and/or the like. In some aspects, the UE 120 may determine CSI by measuring CSI reference signals (CSI-RS) transmitted by the base station 110, which may be referred to as CSI-RS-based CSI (sometimes referred to as CSI-RS-based CQI and/or the like).

Alternatively, the UE 120 may determine CSI by measuring demodulation reference signals (DMRS) transmitted by the base station 110 (e.g., in addition to or as an alternative to measuring CSI-RS), which may be referred to as DMRS-based CSI (sometimes referred to as DMRS-based CQI and/or the like). Because DMRS occur more frequently than CSI-RS, this may provide more up-to-date CSI than using only CSI-RS to determine CSI, which results in faster adaptation to changing channel conditions. Furthermore, because DMRS occur in the RBs scheduled for a data communication (e.g., in the channel used for the data communication), DMRS-based CSI may more accurately reflect channel conditions than CSI-RS-based CSI, which may be transmitted in a wideband, may not capture the precoding used on the data channel, and/or the like. Furthermore, because DMRS is already being transmitted, this does not add any network overhead. In some aspects, DMRS-based CQI may follow a same quantization and/or may use a same table to interpret CQI bits as CSI-RS-based CQI (e.g., 4 bits, representing 16 possible values). Alternatively, DMRS-based CQI may follow a different quantization and/or may use a different table than CSI-RS based CQI (e.g., such as by using 2 bits, 3 bits, and/or the like).

Multi-TRP communications present several challenges associated with using DMRS-based CSI. For example, different TRPs 508 may transmit data communications and corresponding DMRS on the same PDSCH or on different PDSCHs, may transmit PDSCH communications and corresponding DMRS in disjoint RBs and/or symbols, or on overlapping RBs and/or symbols, may schedule PDSCH communications and corresponding DMRS using the same PDCCH or different PDCCHs, may use different DMRS ports and/or DMRS port groups, may have different configurations with respect to DMRS transmissions, and/or the like. Some techniques and apparatuses described herein address these challenges and enable DMRS-based CSI in a multi-TRP scenario. In this way, faster adaptation to changing channel conditions may be achieved, CSI may more accurately reflect channel conditions, and/or the like (e.g., as described above), thereby improving network performance, conserving network resources (e.g., due to fewer retransmissions), conserving other resources (e.g., processing resources, memory resources, battery power, and/or the like) of the base station 110 and the UE 120 (e.g., due to processing fewer retransmissions), and/or the like. Additional details are described below.

As indicated above, FIG. 7 is provided as an example. Other examples may differ from what is described with respect to FIG. 7.

Figure 8:
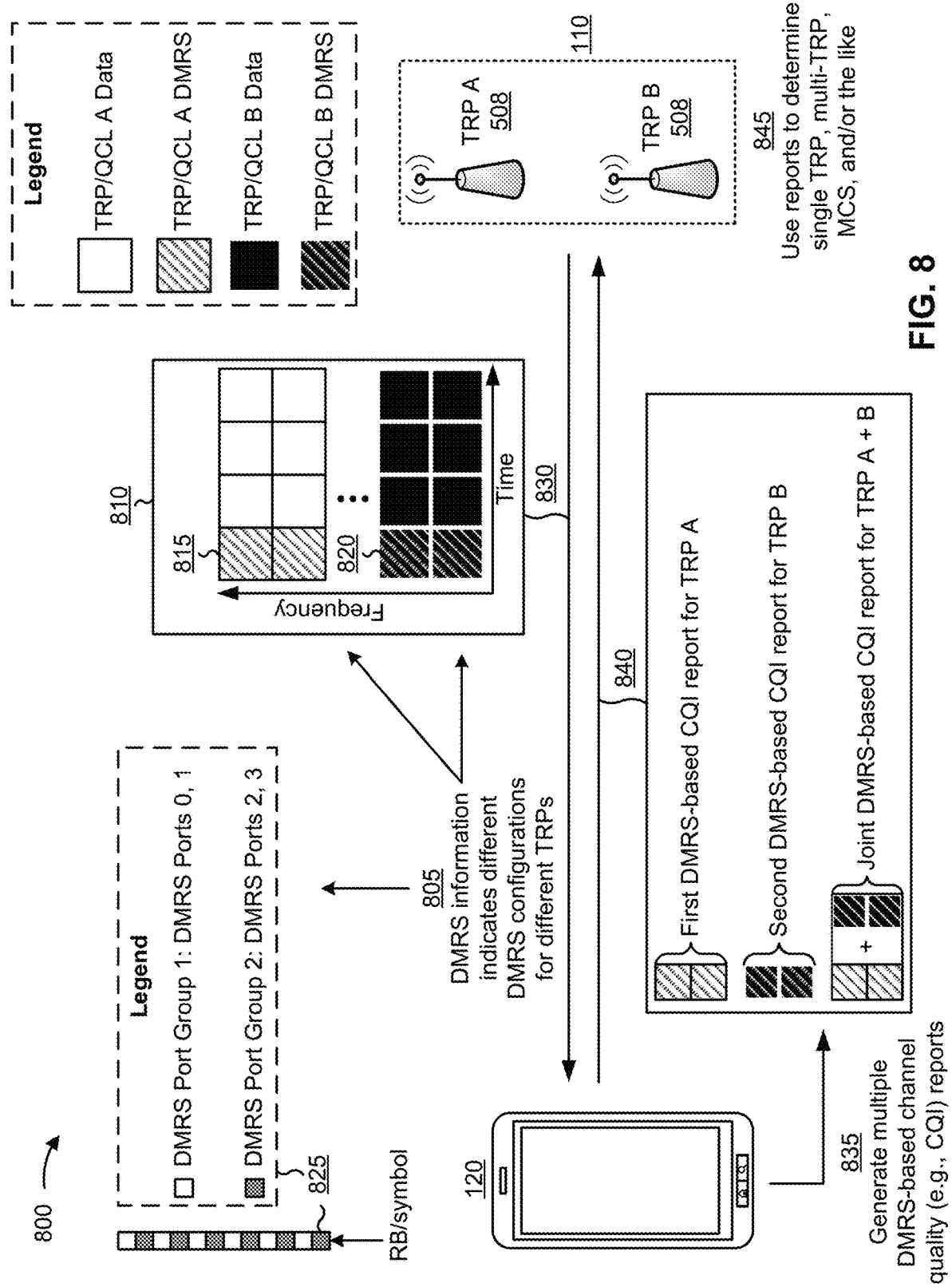
FIGS. 8-9 are diagrams illustrating examples of separately communicating DMRS-based channel information for multiple TRPs, in accordance with various aspects of the present disclosure.

FIG. 8 is a diagram illustrating an example 800 of separately communicating DMRS-based channel information for multiple TRPs, in accordance with various aspects of the present disclosure.

As shown in FIG. 8, multiple TRPs 508 (shown as TRP A and TRP B) may communicate with a UE 120. In some aspects, the multiple TRPs 508 may be included in a single base station 110. In some aspects, different TRPs 508, of the multiple TRPs 508, may be included in different base stations 110. Although two TRPs 508 are shown as communicating with the UE 120, in some aspects, a different number of TRPs 508 (e.g., three TRPs 508, four TRPs 508, and/or the like) may communicate with the UE 120 in a multi-TRP mode, sometimes referred to as a multi-panel mode. Some operations are described herein as being performed by a base station 110. Such operations may be performed by a single TRP 508 included in the base station 110 or by multiple TRPs 508 included in the base station 110.

As shown by reference number 805, the base station 110 may transmit, and the UE 120 may receive, DMRS information that indicates different DMRS configurations for different TRPs 508. For example, the DMRS information may indicate a first DMRS configuration for a first TRP (e.g., TRP A) and a second DMRS configuration for a second TRP (e.g., TRP B). A DMRS configuration may include, for example, a DMRS configuration type (e.g., type 1 or type 2), a number of symbols occupied by a DMRS (e.g. a maximum number of symbols, an actual number of symbols, and/or the like), a resource allocation for a data communication and a corresponding DMRS (e.g., indicating one or more RBs and/or symbols that include DMRS), a quasi co-location (QCL) relationship for DMRS, a TCI state for DMRS, a DMRS port or DMRS port group for the DMRS, a layer (e.g., a MIMO layer) on which the DMRS is transmitted, a PDSCH on which the DMRS is transmitted, whether different sets of DMRS are transmitted in a single PDSCH or different PDSCHs, and/or the like.

For example, as shown by reference number 810, the DMRS information may indicate resources (e.g., time resources, frequency resources, and/or the like) for transmission of a first set of DMRS 815 (e.g., shown as DMRS in two RBs) and a second set of DMRS 820 (e.g., shown as DMRS in a different two RBs). The first set of DMRS 815 may be scheduled for and/or transmitted by the first TRP (e.g., indicated by "TRP/QCL A DMRS"), and the second set of DMRS 820 may be scheduled for and/or transmitted by the second TRP (e.g., indicated by "TRP/QCL B DMRS"). In example 800, the first set of DMRS 815 and the second set of DMRS 820 are shown as overlapping in time (e.g., occurring in overlapping symbols). In some aspects, the first set of DMRS 815 and the second set of DMRS may not overlap in time (e.g., may occur in disjoint symbols), as will be described in more detail below in connection with FIG. 9.

Additionally, or alternatively, the DMRS information may indicate TCI states (e.g., QCL relationships) for the first set of DMRS 815 and the second set of DMRS 820. In some aspects, the first set of DMRS 815 and the second set of DMRS 820 may have different TCI states and/or QCL relationships (e.g., may be associated with different QCL parameters, may have different TCI states, and/or the like). For example, the first set of DMRS 815 may have a first TCI state and/or a first QCL relationship (e.g., indicated by "TRP/QCL A DMRS"), and the second set of DMRS 820 may have a second TCI state and/or a second QCL relationship (e.g., indicated by "TRP/QCL B DMRS").

As shown by reference number 825, the DMRS information may indicate a first DMRS port group associated with the first set of DMRS 815 and a second DMRS port group associated with the second set of DMRS 820. The first DMRS port group may be used by the UE 120 to receive the first set of DMRS 815, and the second DMRS port group may be used by the UE 120 to receive the second set of DMRS 820. As used herein, a DMRS port group may refer to a single DMRS port (e.g., port 0) or a combination of multiple DMRS ports (e.g., port 0 and port 1). In example 800, the first DMRS port group includes port 0 and port 1 of the UE 120, and the second DMRS port group includes port 2 and port 3 of the UE 120. A DMRS port group may correspond to a DMRS code-division multiplexing (CDM) group associated with a particular TCI state (e.g., a first TCI state for a first TRP or a second TCI state for a second TRP). This may correspond to an SDM scheme.

As shown, the multiple DMRS port groups may be used to receive multiple sets of DMRS. This may permit the UE 120 to distinguish between different sets of DMRS associated with different TRPs when those different sets of DMRS overlap in time and frequency (e.g., the different sets of DMRS are transmitted and/or received in overlapping RBs). The UE 120 may use different DMRS ports (e.g., antenna ports) to distinguish between different spatial layers (e.g., in a single TRP mode, a multi-TRP mode, within a DMRS port group, and/or the like) in the case of spatial-division multiplexing (SDM). The UE 120 may use different DMRS port groups (e.g., sets of multiple DMRS ports) in a multi-TRP mode to distinguish between different sets of DMRS when those sets of DMRS overlap in time and frequency (e.g., overlapping RBs), since DMRS ports are not quasi co-located. Thus, in some aspects, the UE 120 may use different DMRS port groups for different sets of DMRS when SDM is used.

For example, the first DMRS port group may be used to receive the first set of DMRS 815 transmitted in a symbol (e.g., via a first set of RBs), and the second DMRS port group may be used to receive the second set of DMRS 820 transmitted in the same symbol (e.g., via a second set of RBs). For example, for a combination of an FDM scheme and an SDM scheme, two DMRS port groups may correspond to two TCI states in a first set of RBs and two DMRS port groups may correspond to another two TCI states in a second set of RBs. In some aspects, the first DMRS port group and the second DMRS port group may be different DMRS port groups (e.g., when the different sets of DMRS overlap in time and frequency (e.g., RBs), as shown by reference number 825). When different DMRS overlap in time and frequency, those DMRS occur in the same resource element. In some aspects, DMRS port groups may only apply when different sets of DMRS overlap in time and frequency (e.g., are transmitted and/or received in overlapping symbols and RBs).

When the different sets of DMRS do not overlap in time and frequency (e.g., RBs), DMRS port groups need not be used. When different DMRS do not overlap in time and/or frequency, those DMRS occur in different symbols or different resource blocks. In this case, the same DMRS port may be used for different sets of DMRS. Alternatively, different DMRS ports or different combinations of DMRS ports may be used for different sets of DMRS (e.g., the DMRS ports used for different sets of DMRS may be different, mutually exclusive, one could be a subset of the other, and/or the like). For example, as shown by reference number 810, when the first set of DMRS 815 and the second set of DMRS 820 overlap in time but not frequency (e.g., not RBs), DMRS port 0 may be used to receive the first set of DMRS 815 having a single transmission layer, and DMRS ports 0 and 1 may be used to receive the second set of DMRS 820 having two transmission layers. Different TCI states and/or QCL relationships may be used for channel estimation for the different sets of DMRS regardless of whether those DMRS overlap in time and/or frequency (e.g., RBs). Thus, in some aspects, the UE 120 may use the same DMRS port group for different sets of DMRS, but may use different RBs and/or OFDM symbols for different sets of DMRS when frequency-division multiplexing (FDM) or time-division multiplexing (TDM) is used.

Additionally, or alternatively, the DMRS information may indicate a first set of layers (e.g., a first set of MIMO layers) for transmission of the first set of DMRS 815 and a second set of layers (e.g., a second set of MIMO layers) for transmission of the second set of DMRS 820. Additionally, or alternatively, the DMRS information may indicate a first number of layers for the first set of DMRS 815 and a second number of layers for the second set of DMRS 820. In some aspects, the different sets of DMRS may be associated with the same number of layers (e.g., 1 layer each, 2 layers each, and/or the like). In some aspects, the different sets of DMRS may be associated with different numbers of layers (e.g., 1 layer for the first set and 2 layers for the second set, and/or the like). Additionally, or alternatively, the DMRS information may indicate whether different sets of DMRS and corresponding data communication are to be transmitted in a single PDSCH (e.g., for Multi-TRP Mode 1) or in multiple PDSCHs (e.g., for Multi-TRP Mode 2). If the different sets of DMRS are transmitted in different PDSCHs, then the DMRS information may indicate a first PDSCH in which the first set of DMRS 815 is to be transmitted and a second PDSCH in which the second set of DMRS 820 is to be transmitted.

In some aspects, the DMRS information may be indicated in a radio resource control (RRC) message (e.g., an RRC configuration message, an RRC reconfiguration message, and/or the like), in a media access control (MAC) control element (CE) (MAC-CE), in downlink control information (DCI), and/or the like. In some aspects, the DMRS information may be indicated in a combination of messages, such as a combination of two or more of an RRC message, a MAC-CE, DCI, and/or the like.

For example, the resources used for the sets of DMRS may be indicated in an RRC message and DCI. In some aspects, the RRC message may indicate a DMRS configuration type (e.g., type 1 or type 2) and/or a number of DMRS symbols (e.g., a number of symbols occupied by a single DMRS, such as one symbol, two symbols, or more than two symbols), and the DCI may indicate a resource allocation for a data communication (e.g., including DMRS symbols and data symbols). In some aspects, this DMRS information may be combined to determine the locations of the sets of DMRS (e.g., in the time domain, in the frequency domain, the symbols that include DMRS, the RBs that include DMRS, and/or the like).

Additionally, or alternatively, the TCI states and/or the QCL relationships for the sets of DMRS may be indicated in an RRC message, a MAC-CE, and/or DCI. For example, the RRC message may indicate a set of candidate TCI states, the MAC-CE may indicate a set of activated TCI states of the set of candidate TCI states, and the DCI may be used to indicate a selected TCI state from the set of activated TCI states. Additionally, or alternatively, DCI may be used to indicate DMRS ports and/or a DMRS port group corresponding to the sets of DMRS, RBs corresponding to the sets of DMRS, symbol locations corresponding to the sets of DMRS, layers corresponding to the sets of DMRS (e.g., which may be indicated via an indication of the DMRS ports), a number of layers corresponding to each set of DMRS, and/or the like. In some aspects, a TCI field of the DCI may indicate two TCI states corresponding to two QCL relationships for the two DMRS ports and/or two DMRS port groups. Additionally, or alternatively, an RRC message may be used to indicate whether different sets of DMRS are transmitted in a single PDSCH or different PDSCHs, PDSCH(s) corresponding to the sets of DMRS, layers corresponding to the sets of DMRS, and/or the like.

In some aspects, the DMRS information may be indicated by a single TRP (e.g., TRP A or TRP B). For example, when a single PDCCH transmitted by a single TRP (e.g., Mode 1) is used for scheduling PDSCH communications for multiple TRPs, DMRS information for the multiple TRPs may be carried in the single PDCCH. In some aspects, the DMRS information may be indicated by multiple TRPs (e.g., TRP A and TRP B). For example, when multiple PDCCHs transmitted by multiple TRPs (e.g., Mode 2) are used for scheduling respective PDSCH communications for those TRPs, DMRS information for the multiple TRPs may be carried in the multiple PDCCHs. In some aspects, a specific TRP may indicate DMRS information for that specific TRP. In some aspects, the DMRS information may be indicated by a combination of information transmitted by a first TRP and information transmitted by a second TRP.

As shown by reference number 830, the base station 110 may transmit, and the UE 120 may receive, the first set of DMRS 815 and a corresponding first data communication (e.g., shown as "TRP/QCL A Data"), and may transmit the second set of DMRS 820 and a corresponding second data communication (e.g., shown as "TRP/QCL B Data"). The UE 120 may monitor for and/or receive the first set of DMRS 815 and the second set of DMRS 820 based at least in part on the DMRS information, as described above. For example, the UE 120 may receive the first set of DMRS 815 via a first DMRS port group, and may receive the second set of DMRS 820 via a second DMRS port group to permit the UE 120 to differentiate these sets of DMRS. Alternatively, the UE 120 may receive the first set of DMRS 815 via one or more first DMRS ports, and may receive the second set of DMRS 820 via one or more second DMRS ports to permit the UE 120 to differentiate these sets of DMRS.

As shown by reference number 835, the UE 120 may generate multiple DMRS-based channel quality reports based at least in part on the first set of DMRS 815 and/or the second set of DMRS 820. In some aspects, a DMRS-based channel quality report may include a DMRS-based CSI report, a DMRS-based CQI report, and/or the like. In some aspects, the UE 120 may generate a first DMRS-based channel quality report (CQR) using only the first set of DMRS 815 (e.g., and not the second set of DMRS 820). Additionally, or alternatively, the UE 120 may generate a second DMRS-based CQR using only the second set of DMRS 820 (e.g., and not the first set of DMRS 815). Additionally, or alternatively, the UE 120 may generate a joint DMRS-based CQR using both the first set of DMRS 815 and not the second set of DMRS 820.

In some aspects, the UE 120 may determine which DMRS-based CQRs to generate and/or transmit based at least in part on a multi-TRP transmission mode configured for the UE 120 (e.g., Mode 1 or Mode 2, as described elsewhere herein). In some aspects, the UE 120 may generate and/or transmit the joint DMRS-based CQR when operating in a first multi-TRP transmission mode (e.g., Mode 1) that uses a single PDSCH for transmissions from multiple TRPs. This joint DMRS-based CQR may indicate a channel quality of the single PDSCH for joint TRP transmissions. In some aspects, the UE 120 may refrain from generating and/or transmitting the joint DMRS-based CQR when operating in a second multi-TRP transmission mode (e.g., Mode 2) that uses different PDSCHs for transmissions from different TRPs. In this case, there is no joint transmission on a single PDSCH, so the UE 120 may conserve UE resources and network resources by refraining from generating and/or transmitting the joint DMRS-based CQR in the second multi-TRP transmission mode.

In some aspects, a DMRS-based CQR (e.g., the first, second, or joint DMRS-based CQR) may be a single bit. In this case, the DMRS-based CQR may indicate whether a communication from the first TRP, the second TRP, or both TRPs is useful. In some aspects, a DMRS-based CQR (e.g., the first, second, or joint DMRS-based CQR) may includes multiple bits. In this way, more information can be conveyed regarding channel quality from the first TRP, the second TRP, or both TRPs. This information may be used by the base station 110 to determine whether to communicate with the UE 120 using one or more TRPs, an MCS to be used for communications, and/or the like, as described in more detail below.

As shown by reference number 840, the UE 120 may transmit, and the base station 110 may receive, the generated DMRS-based CQRs (e.g., the first DMRS-based CQR, the second DMRS-based CQR, and/or the joint DMRS-based CQR), shown in FIG. 8 as DMRS-based CQI reports as an example. In some aspects, the UE 120 may generate and/or transmit only the first DMRS-based CQR and the second DMRS-based CQR. In some aspects, the UE 120 may generate and/or transmit the first DMRS-based CQR, the second DMRS-based CQR, and the joint DMRS-based CQR. In some aspects, the UE 120 may generate other combinations of DMRS-based CQRs depending on the number of TRPs 508 communicating with the UE 120 via a PDSCH.

In some aspects, the UE 120 may transmit different DMRS-based CQRs on different physical uplink control channel (PUCCH) resources (e.g., time resources, frequency resources, spatial resources symbols, RBs, and/or the like). For example, the UE 120 may transmit the first DMRS-based CQR on a first PUCCH resource, may transmit the second DMRS-based CQR on a second PUCCH resource, and/or may transmit the joint DMRS-based CQR on a third PUCCH resource. In some aspects, the base station 110 may transmit, and the UE 120 may receive, an indication of the different PUCCH resources to be used for the different DMRS-based CQRs. For example, such an indication may be transmitted in an RRC message, a MAC-CE, DCI, and/or the like. In this way, the base station 110 may be capable of distinguishing the different DMRS-based CQR based at least in part on a PUCCH resource in which a DMRS-based CQR is received.

Additionally, or alternatively, the UE 120 may transmit different DMRS-based CQRs using different headers (e.g., different bit values in a header of the DMRS-based CQR). A value of the header may indicate whether the DMRS-based CQR was generated using DMRS from only the first TRP, only the second TRP, or both the first TRP and the second TRP. In some aspects, the UE 120 may use a header to distinguish the DMRS-based CQRs, when the DMRS-based CQRs are multiplexed on a physical uplink shared channel (PUSCH) (e.g., and therefore are not transmitted in different PUCCH resources). In this way, the base station 110 may be capable of using the headers to distinguish the different DMRS-based CQRs.

As shown by reference number 845, the base station 110 (e.g., the first TRP and/or the second TRP) may communicate with the UE 120 based at least in part on the DMRS-based CQRs. For example, the base station 110 may determine whether to transmit (e.g., a subsequent communication) using only the first TRP or only the second TRP. For example, if the first DMRS-based CQR indicates good channel quality (e.g., that satisfies a threshold) and the second DMRS-based CQR indicates poor channel quality (e.g., that does not satisfy a threshold), then the base station 110 may transmit a subsequent communication using only the first TRP, and not the second TRP. Similarly, if the second DMRS-based CQR indicates good channel quality (e.g., that satisfies a threshold) and the first DMRS-based CQR indicates poor channel quality (e.g., that does not satisfy a threshold), then the base station 110 may transmit a subsequent communication using only the second TRP, and not the first TRP.

Additionally, or alternatively, the base station 110 may determine whether to transmit using a single TRP mode or a multi-TRP mode based at least in part on the DMRS-based CQRs. For example, the base station 110 may determine whether to transmit (e.g., a subsequent communication) using only the first TRP, only the second TRP, or both the first TRP and the second TRP (e.g., using a multi-TRP transmission). For example, if the joint DMRS-based CQR indicates poor channel quality (e.g., that does not satisfy a threshold), then the base station 110 may transmit a subsequent communication using only the first TRP or only the second TRP (e.g., as described above). However, if the joint DMRS-based CQR indicates good channel quality (e.g., that satisfies a threshold), then the base station 110 may transmit a subsequent communication using both the first TRP and the second TRP.

Additionally, or alternatively, the base station 110 may determine an MCS (e.g., for a subsequent communication) based at least in part on DMRS-based CQRs. For example, after determining whether to transmit a subsequent communication using only the first TRP, the second TRP, or both TRPs, the base station 110 may determine an MCS for the subsequent communication. In some aspects, if the base station 110 determines to transmit using only the first TRP, then the base station 110 may determine an MCS for such a transmission using only the first DMRS-based CQR (e.g., and not the second DMRS-based CQR). Similarly, if the base station 110 determines to transmit using only the second TRP, then the base station 110 may determine an MCS for such a transmission using only the second DMRS-based CQR (e.g., and not the first DMRS-based CQR). If the base station 110 determines to transmit using both the first TRP and the second TRP, then the base station 110 may determine respective MCSs for those transmissions using both the first DMRS-based CQR (e.g., for a transmission from the first TRP) and the second DMRS-based CQR (e.g., for a transmission from the second TRP). Alternatively, if the base station 110 determines to transmit using both the first TRP and the second TRP, then the base station 110 may determine respective MCSs for those transmissions using the joint DMRS-based CQR.

In some aspects, in addition to using the DMRS-based CQRs to determine whether to transmit using only the first TRP, only the second TRP, or both the first TRP and the second TRP, the base station 110 may make this determination based at least in part on one or more other factors, such as resource availability (e.g., at the first TRP and/or the second TRP), network load (e.g., at the first TRP and/or the second TRP), a condition associated with one or more UEs served by the first TRP and/or the second TRP, one or more MCSs described above, and/or the like. Additionally, or alternatively, the base station 110 may use one or more of these factors to determine an MCS to be used for a first transmission by the first TRP, a second transmission by the second TRP, or a joint transmission by both the first TRP and the second TRP.

By using DMRS-based CQRs in a multi-TRP mode, one or more base stations 110 may receive a more accurate representation of channel conditions being experienced by the UE 120 and may react more quickly (e.g., as compared to using CSI-RS-based CQRs) to changing channel conditions from a single TRP and/or from multiple TRPs. For example, the base station(s) 110 may quickly determine whether to transmit using only a single TRP, which TRP to use for transmissions, and/or whether to transmit using multiple TRPs. In this way, network resources may be conserved by avoiding transmission from a TRP when that TRP has poor channel conditions with the UE 120, avoiding retransmissions due to poor channel conditions, and/or the like. Additionally, or alternatively, resources (e.g., processing resources, memory resources, battery power, and/or the like) of the base station 110 and/or the UE 120 may be conserved by preventing processing of communications that are likely to fail, avoiding retransmissions of such failed communications, and/or the like. Additionally, or alternatively, throughput may be increased, latency may be reduced, reliability may be improved, and/or the like by transmitting using multiple TRPs when channel conditions for those multiple TRPs are good.

As indicated above, FIG. 8 is provided as an example. Other examples may differ from what is described with respect to FIG. 8.

Figure 9:
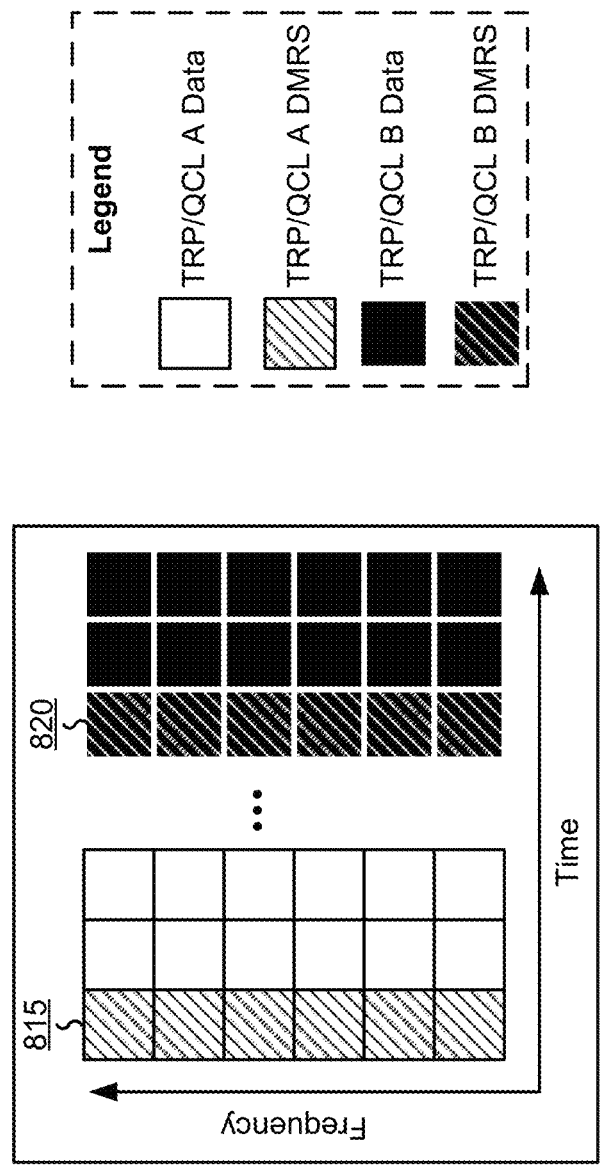

FIG. 9 is a diagram illustrating another example 900 of separately communicating DMRS-based channel information for multiple TRPs, in accordance with various aspects of the present disclosure.

FIG. 9 shows a different resource allocation for PDSCH communications and corresponding DMRS than the resource allocation shown in FIG. 8 (e.g., described above in connection with reference number 810). In FIG. 8, the first set of DMRS 815 and the second set of DMRS 820 are shown as overlapping in time (e.g., occurring in overlapping symbols). In FIG. 9, the first set of DMRS 815 and the second set of DMRS 820 do not overlap in time (e.g., occur in different or disjoint symbols). Thus, the techniques described herein may apply to a variety of DMRS resource allocations.

As indicated above, FIG. 9 is provided as an example. Other examples may differ from what is described with respect to FIG. 9.

Figure 10:
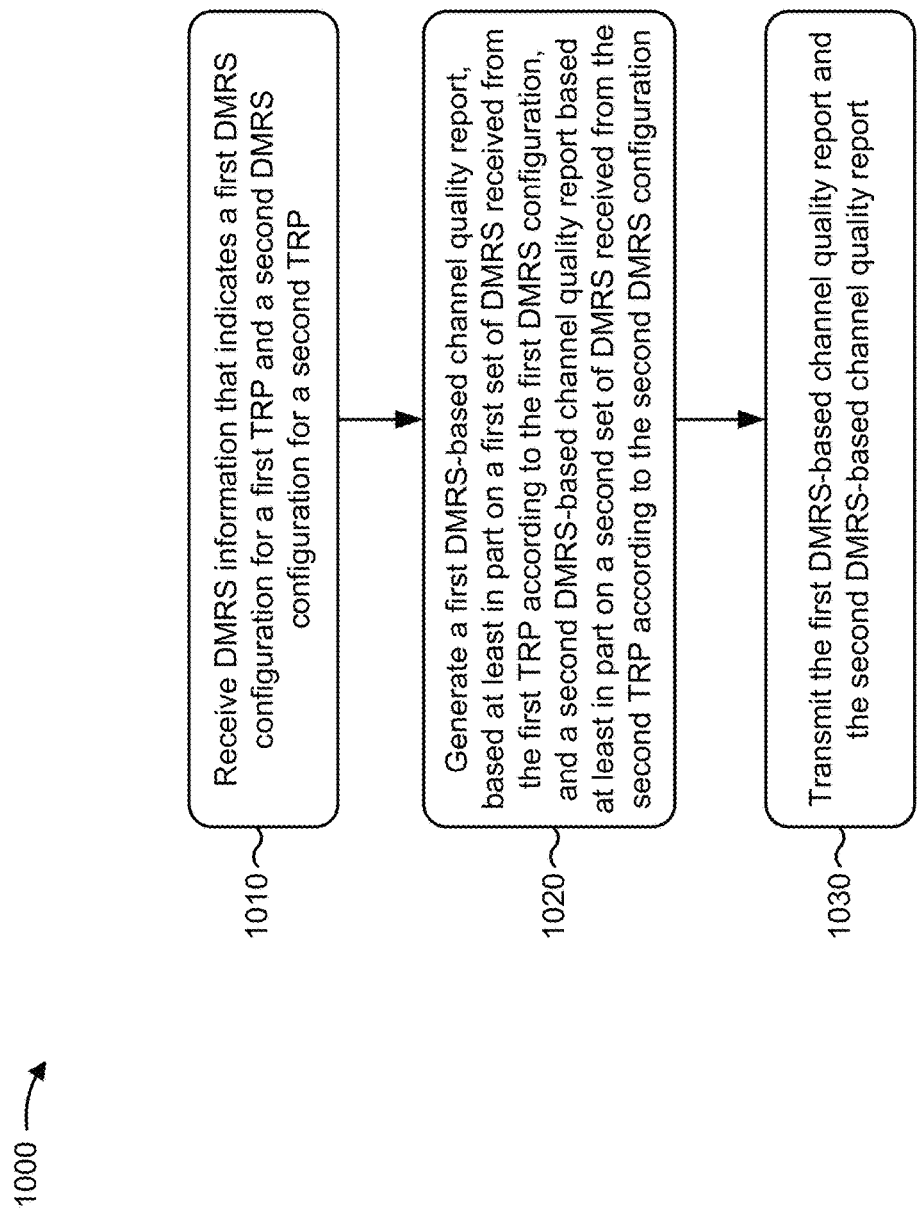
FIGS. 10-11 are diagrams illustrating example processes relating to separately communicating DMRS-based channel information for multiple TRPs, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120 and/or the like) performs operations associated with separately communicating DMRS-based channel information for multiple TRPs.

As shown in FIG. 10, in some aspects, process 1000 may include receiving demodulation reference signal (DMRS) information that indicates a first DMRS configuration for a first transmit receive point (TRP) and a second DMRS configuration for a second TRP (block 1010). For example, the UE (e.g., using antenna 252, DEMOD 254, MIMO detector 256, receive processor 258, controller/processor 280, and/or the like) may receive DMRS information that indicates a first DMRS configuration for a first TRP and a second DMRS configuration for a second TRP, as described above.

As shown in FIG. 10, in some aspects, process 1000 may include generating a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration (block 1020). For example, the UE (e.g., using controller/processor 280 and/or the like) may generate a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration, as described above.

As shown in FIG. 10, in some aspects, process 1000 may include transmitting the first DMRS-based channel quality report and the second DMRS-based channel quality report (block 1030). For example, the UE (e.g., using controller/processor 280, transmit processor 264, TX MIMO processor 266, MOD 254, antenna 252, and/or the like) may transmit the first DMRS-based channel quality report and the second DMRS-based channel quality report, as described above.

Process 1000 may include additional aspects, such as any single aspect or any combination of aspects described below and/or in connection with one or more other processes described elsewhere herein.

In a first aspect, the first set of DMRS and the second set of DMRS are transmitted using different TCI states (e.g., different QCL relationships), different layers, different physical downlink shared channels, or a combination thereof.

In a second aspect, alone or in combination with the first aspect, the first set of DMRS and the second set of DMRS are transmitted in a same physical downlink shared channel, and a type of the first DMRS configuration is the same as a type of the second DMRS configuration.

In a third aspect, alone or in combination with one or more of the first and second aspects, the first set of DMRS is received via a first DMRS port group and the second set of DMRS is received via a second DMRS port group.

In a fourth aspect, alone or in combination with one or more of the first through third aspects, the first DMRS port group and the second DMRS port group are determined based at least in part on the first DMRS configuration and the second DMRS configuration.

In a fifth aspect, alone or in combination with one or more of the first through fourth aspects, the first set of DMRS and the second set of DMRS are received in overlapping resource blocks, overlapping symbols, or a combination thereof.

In a sixth aspect, alone or in combination with one or more of the first through fifth aspects, the first set of DMRS and the second set of DMRS are received in different resource blocks, different symbols, or a combination thereof.

In a seventh aspect, alone or in combination with one or more of the first through sixth aspects, the DMRS information is included in at least one of: a radio resource control (RRC) message, a media access control (MAC) control element, downlink control information, or a combination thereof.

In an eighth aspect, alone or in combination with one or more of the first through seventh aspects, the DMRS information indicates, for at least one of the first set of DMRS or the second set of DMRS, at least one of: a DMRS configuration type, a number of DMRS symbols, a set of activated transmission configuration indication (TCI) states, a TCI state to be used for a physical downlink shared channel (PDSCH), a TCI state, a quasi co-located (QCL) relationship, a DMRS port, a DMRS code-division multiplexing (CDM) group, a DMRS port group, a set of resource blocks, a set of symbol locations, or a combination thereof.

In a ninth aspect, alone or in combination with one or more of the first through eighth aspects, at least one of the first DMRS-based channel quality report or the second DMRS-based channel quality report is one bit.

In a tenth aspect, alone or in combination with one or more of the first through ninth aspects, at least one of the first DMRS-based channel quality report or the second DMRS-based channel quality report includes multiple bits.

In an eleventh aspect, alone or in combination with one or more of the first through tenth aspects, process 1000 includes transmitting a joint DMRS-based channel quality report based at least in part on the first set of DMRS and the second set of DMRS.

In a twelfth aspect, alone or in combination with one or more of the first through eleventh aspects, the first DMRS-based channel quality report, the second DMRS-based channel quality report, and the joint DMRS-based channel quality report are transmitted using at least one of: different physical uplink control channel (PUCCH) resources, different headers, or a combination thereof.

In a thirteenth aspect, alone or in combination with one or more of the first through twelfth aspects, the first DMRS-based channel quality report and the second DMRS-based channel quality report are transmitted using at least one of: different physical uplink control channel (PUCCH) resources, different headers, or a combination thereof.

In a fourteenth aspect, alone or in combination with one or more of the first through thirteenth aspects, the first DMRS-based channel quality report is a first DMRS-based channel quality indicator (CQI) report and the second DMRS-based channel quality report is a second DMRS-based CQI report.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
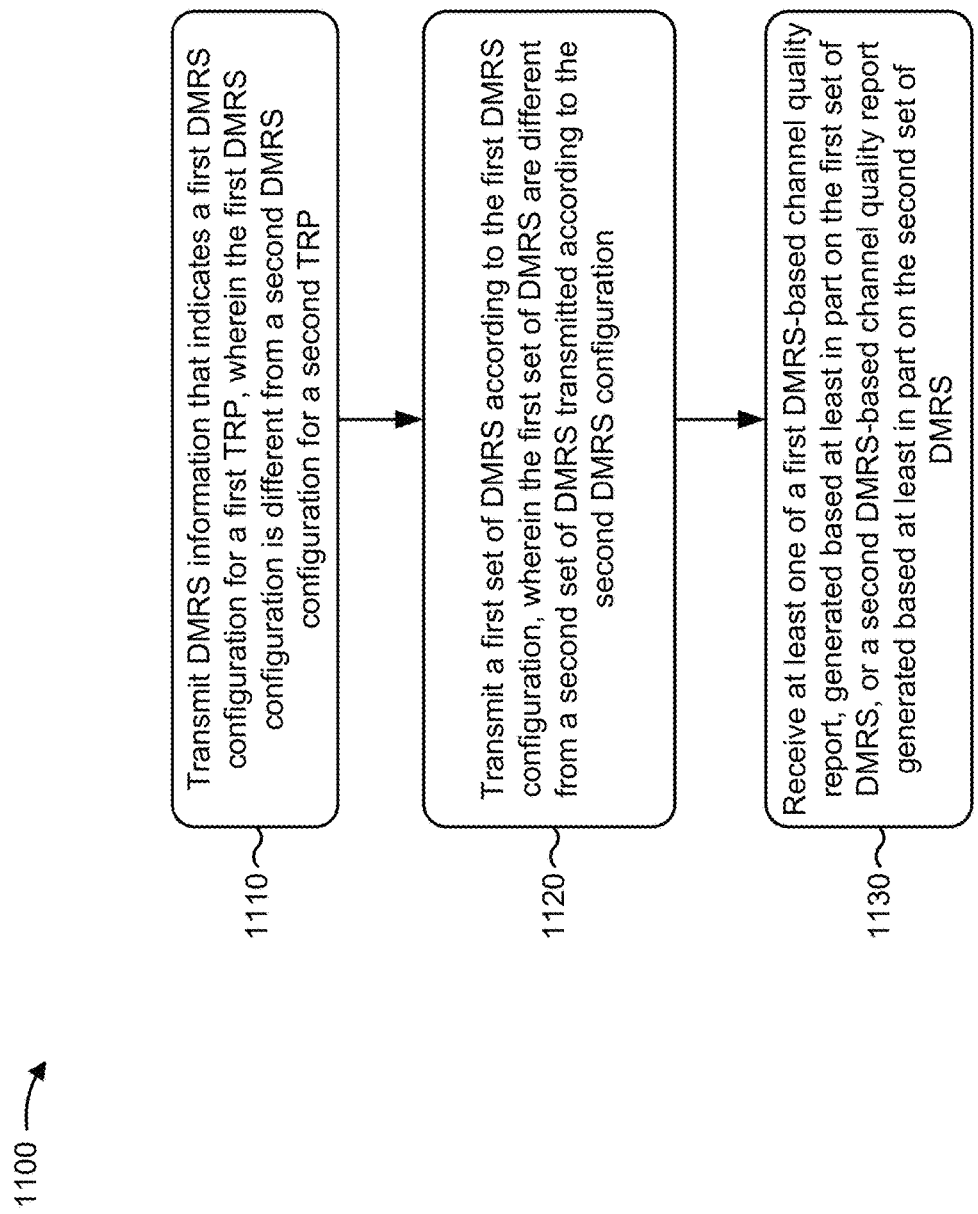

FIG. 11 is a diagram illustrating an example process 1100 performed, for example, by a base station, in accordance with various aspects of the present disclosure. Example process 1100 is an example where a base station (e.g., base station 110, TRP 508, a first TRP 508, a second TRP 508, and/or the like) performs operations associated with separately communicating DMRS-based channel information for multiple TRPs.

As shown in FIG. 11, in some aspects, process 1100 may include transmitting demodulation reference signal (DMRS)

information that indicates a first DMRS configuration for a first transmit receive point (TRP), wherein the first DMRS configuration is different from a second DMRS configuration for a second TRP (block 1110). For example, the base station (e.g., using controller/processor 240, transmit processor 220, TX MIMO processor 230, MOD 232, antenna 234, and/or the like) may transmit DMRS information that indicates a first DMRS configuration for a first TRP, as described above. In some aspects, the first DMRS configuration is different from a second DMRS configuration for a second TRP.

As shown in FIG. 11, in some aspects, process 1100 may include transmitting a first set of DMRS according to the first DMRS configuration, wherein the first set of DMRS are different from a second set of DMRS transmitted according to the second DMRS configuration (block 1120). For example, the base station (e.g., using controller/processor 240, transmit processor 220, TX MIMO processor 230, MOD 232, antenna 234, and/or the like) may transmit a first set of DMRS according to the first DMRS configuration, as described above. In some aspects, the first set of DMRS are different from a second set of DMRS transmitted according to the second DMRS configuration.

As shown in FIG. 11, in some aspects, process 1100 may include receiving at least one of a first DMRS-based channel quality report, generated based at least in part on the first set of DMRS, or a second DMRS-based channel quality report generated based at least in part on the second set of DMRS (block 1130). For example, the base station (e.g., using antenna 234, DEMOD 232, MIMO detector 236, receive processor 238, controller/processor 240, and/or the like) may receive at least one of a first DMRS-based channel quality report, generated based at least in part on the first set of DMRS, or a second DMRS-based channel quality report generated based at least in part on the second set of DMRS, as described above.

Process 1100 may include additional aspects, such as any single aspect or any combination of aspects described below and/or in connection with one or more other processes described elsewhere herein.

In a first aspect, process 1100 may include determining whether to transmit using only the first TRP or only the second TRP based at least in part on the first DMRS-based channel quality report and the second DMRS-based channel quality report.

In a second aspect, alone or in combination with the first aspect, process 1100 may include receiving a joint DMRS-based channel quality report generated based at least in part on the first set of DMRS and the second set of DMRS.

In a third aspect, alone or in combination with one or more of the first and second aspects, process 1100 may include determining whether to transmit using only the first TRP, only the second TRP, or both the first TRP and the second TRP based at least in part on at least one of the first DMRS-based channel quality report, the second DMRS-based channel quality report, or the joint DMRS-based channel quality report.

In a fourth aspect, alone or in combination with one or more of the first through third aspects, the first DMRS-based channel quality report, the second DMRS-based channel quality report, and the joint DMRS-based channel quality report are received using at least one of: different physical uplink control channel (PUCCH) resources, different headers, or a combination thereof.

In a fifth aspect, alone or in combination with one or more of the first through fourth aspects, process 1100 may include determining a first modulation and coding scheme (MCS) for a first transmission on only the first TRP, a second MCS for a second transmission on only the second TRP, or a third MCS for a joint transmission on both the first TRP and the second TRP.

In a sixth aspect, alone or in combination with one or more of the first through fifth aspects, the first MCS is determined based at least in part on the first DMRS-based channel quality report, the second is determined based at least in part on the second DMRS-based channel quality report, or the third MCS is determined based at least in part on a joint DMRS-based channel quality report.

In a seventh aspect, alone or in combination with one or more of the first through sixth aspects, process 1100 includes determining whether to schedule a communication using only the first TRP, only the second TRP, or both the first TRP and the second TRP based at least in part on the first MCS, the second MCS, the third MCS, and at least one of: resource availability, network load, a condition associated with one or more user equipment (UEs) served by at least one of the first TRP or the second TRP, or a combination thereof.

In a seventh aspect, alone or in combination with one or more of the first through sixth aspects, the first set of DMRS and the second set of DMRS are transmitted using different TCI states, different layers, different physical downlink shared channels, or a combination thereof.

In an eighth aspect, alone or in combination with one or more of the first through seventh aspects, the first set of DMRS and the second set of DMRS are transmitted in a same physical downlink shared channel.

In a ninth aspect, alone or in combination with one or more of the first through eighth aspects, the first set of DMRS is associated with a first DMRS port group and the second set of DMRS is associated with a second DMRS port group.

In a tenth aspect, alone or in combination with one or more of the first through ninth aspects, the first DMRS port group and the second DMRS port group are indicated in the DMRS information.

In an eleventh aspect, alone or in combination with one or more of the first through tenth aspects, the first set of DMRS and the second set of DMRS are transmitted in overlapping resource blocks, overlapping symbols, or a combination thereof.

In a twelfth aspect, alone or in combination with one or more of the first through eleventh aspects s, the first set of DMRS and the second set of DMRS are transmitted in different resource blocks, different symbols, or a combination thereof.

In a thirteenth aspect, alone or in combination with one or more of the first through twelfth aspects, the DMRS information is included in at least one of: a radio resource control (RRC) message, a media access control (MAC) control element, downlink control information, or a combination thereof.

In a fourteenth aspect, alone or in combination with one or more of the first through thirteenth aspects, the DMRS information indicates, for at least one of the first set of DMRS or the second set of DMRS, at least one of: a DMRS configuration type, a number of DMRS symbols, a set of activated transmission configuration indication (TCI) states, a TCI state to be used for a physical downlink shared channel (PDSCH), a quasi co-located (QCL) relationship, a DMRS port, a DMRS port group, a set of resource blocks, a set of symbol locations, or a combination thereof.

In a fifteenth aspect, alone or in combination with one or more of the first through fourteenth aspects, at least one of the first DMRS-based channel quality report or the second DMRS-based channel quality report is one bit.

In a sixteenth aspect, alone or in combination with one or more of the first through fifteenth aspects, at least one of the first DMRS-based channel quality report or the second DMRS-based channel quality report includes multiple bits.

In a seventeenth aspect, alone or in combination with one or more of the first through sixteenth aspects, the first DMRS-based channel quality report and the second DMRS-based channel quality report are received using at least one of: different physical uplink control channel (PUCCH) resources, different headers, or a combination thereof.

In an eighteenth aspect, alone or in combination with one or more of the first through seventeenth aspects, the first DMRS-based channel quality report is a first DMRS-based channel quality indicator (CQI) report and the second DMRS-based channel quality report is a second DMRS-based CQI report.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like, depending on the context.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving demodulation reference signal (DMRS) information that indicates a first DMRS configuration for a first transmit receive point (TRP) and a second DMRS configuration for a second TRP;
   generating a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration, wherein the first set of DMRS and the second set of DMRS are transmitted in a same physical downlink shared channel, and wherein a type of the first DMRS configuration is same as a type of the second DMRS configuration; and
   transmitting the first DMRS-based channel quality report and the second DMRS-based channel quality report.

2. The method of claim 1, wherein the first set of DMRS is received via a first DMRS port group and the second set of DMRS is received via a second DMRS port group.

3. The method of claim 2, wherein the first DMRS port group and the second DMRS port group are determined based at least in part on the first DMRS configuration and the second DMRS configuration.

4. The method of claim 2, wherein the first set of DMRS and the second set of DMRS are received in overlapping resource blocks, overlapping symbols, or a combination thereof.

5. The method of claim 1, wherein the first set of DMRS and the second set of DMRS are received in different resource blocks, different symbols, or a combination thereof.

6. The method of claim 1, wherein the DMRS information is included in at least one of:
   a radio resource control (RRC) message,
   a media access control (MAC) control element,
   downlink control information, or
   a combination thereof.

7. The method of claim 1, wherein the DMRS information indicates, for at least one of the first set of DMRS or the second set of DMRS, at least one of:
   a DMRS configuration type,
   a number of DMRS symbols,
   a set of activated transmission configuration indication (TCI) states,
   a TCI state,
   a quasi co-located (QCL) relationship,
   a DMRS port,
   a DMRS port group,
   a DMRS code-division multiplexing (CDM) group, a set of resource blocks,
a set of symbol locations, or
a combination thereof.

8. The method of claim 1, wherein at least one of the first DMRS-based channel quality report or the second DMRS-based channel quality report is one bit.

9. The method of claim 1, wherein at least one of the first DMRS-based channel quality report or the second DMRS-based channel quality report includes multiple bits.

10. The method of claim 1, further comprising transmitting a joint DMRS-based channel quality report based at least in part on the first set of DMRS and the second set of DMRS.

11. The method of claim 10, wherein the first DMRS-based channel quality report, the second DMRS-based channel quality report, and the joint DMRS-based channel quality report are transmitted using at least one of:
different physical uplink control channel (PUCCH) resources,
different headers, or
a combination thereof.

12. The method of claim 1, wherein the first DMRS-based channel quality report and the second DMRS-based channel quality report are transmitted using at least one of:
different physical uplink control channel (PUCCH) resources,
different headers, or
a combination thereof.

13. The method of claim 1, wherein the first DMRS-based channel quality report is a first DMRS-based channel quality indicator (CQI) report and the second DMRS-based channel quality report is a second DMRS-based CQI report.

14. A method of wireless communication performed by a base station, comprising:
transmitting demodulation reference signal (DMRS) information that indicates a first DMRS configuration for a first transmit receive point (TRP), wherein the first DMRS configuration is different from a second DMRS configuration for a second TRP;
transmitting a first set of DMRS according to the first DMRS configuration, wherein the first set of DMRS are different from a second set of DMRS transmitted according to the second DMRS configuration;
receiving at least one of a first DMRS-based channel quality report, generated based at least in part on the first set of DMRS, or a second DMRS-based channel quality report generated based at least in part on the second set of DMRS; and
receiving a joint DMRS-based channel quality report generated based at least in part on the first set of DMRS and the second set of DMRS.

15. The method of claim 14, further comprising determining whether to transmit using only the first TRP or only the second TRP based at least in part on the first DMRS-based channel quality report and the second DMRS-based channel quality report.

16. The method of claim 14, further comprising determining whether to transmit using only the first TRP, only the second TRP, or both the first TRP and the second TRP based at least in part on at least one of the first DMRS-based channel quality report, the second DMRS-based channel quality report, or the joint DMRS-based channel quality report.

17. The method of claim 14, wherein the first DMRS-based channel quality report, the second DMRS-based channel quality report, and the joint DMRS-based channel quality report are received using at least one of:
different physical uplink control channel (PUCCH) resources,
different headers, or
a combination thereof.

18. The method of claim 14, further comprising determining a first modulation and coding scheme (MCS) for a first transmission on only the first TRP, a second MCS for a second transmission on only the second TRP, or a third MCS for a joint transmission on both the first TRP and the second TRP.

19. The method of claim 18, wherein the first MCS is determined based at least in part on the first DMRS-based channel quality report, the second MCS is determined based at least in part on the second DMRS-based channel quality report, or the third MCS is determined based at least in part on the joint DMRS-based channel quality report.

20. The method of claim 18, further comprising determining whether to schedule a communication using only the first TRP, only the second TRP, or both the first TRP and the second TRP based at least in part on the first MCS, the second MCS, the third MCS, and at least one of:
resource availability,
network load,
a condition associated with one or more user equipment (UEs) served by at least one of the first TRP or the second TRP, or
a combination thereof.

21. The method of claim 14, wherein the first set of DMRS and the second set of DMRS are transmitted using different transmission configuration indication (TCI) states, different layers, different physical downlink shared channels, or a combination thereof.

22. The method of claim 14, wherein the first set of DMRS and the second set of DMRS are transmitted in a same physical downlink shared channel.

23. The method of claim 14, wherein the first set of DMRS is associated with a first DMRS port group and the second set of DMRS is associated with a second DMRS port group.

24. The method of claim 23, wherein the first set of DMRS and the second set of DMRS are transmitted in overlapping resource blocks, overlapping symbols, or a combination thereof.

25. The method of claim 14, wherein the first set of DMRS and the second set of DMRS are transmitted in different resource blocks, different symbols, or a combination thereof.

26. A user equipment (UE) for wireless communication, comprising:
a memory; and
one or more processors operatively coupled to the memory, the memory and the one or more processors configured to:
receive demodulation reference signal (DMRS) information that indicates a first DMRS configuration for a first transmit receive point (TRP) and a second DMRS configuration for a second TRP;
generate a first DMRS-based channel quality report, based at least in part on a first set of DMRS received from the first TRP according to the first DMRS configuration, and a second DMRS-based channel quality report based at least in part on a second set of DMRS received from the second TRP according to the second DMRS configuration, wherein the first set of DMRS and the second set of DMRS are transmitted in a same physical downlink shared channel, and wherein a type of the first DMRS configuration is same as a type of the second DMRS configuration; and transmit the first DMRS-based channel quality report and the second DMRS-based channel quality report.

27. The UE of claim 26, wherein the first set of DMRS is received via a first DMRS port group and the second set of DMRS is received via a second DMRS port group.

28. The UE of claim 26, wherein the first set of DMRS and the second set of DMRS are received in different resource blocks, different symbols, or a combination thereof.

29. The UE of claim 26, wherein the DMRS information is included in at least one of:
   a radio resource control (RRC) message,
   a media access control (MAC) control element,
   downlink control information, or
   a combination thereof.

30. A base station for wireless communication, comprising:
   a memory; and
   one or more processors operatively coupled to the memory, the memory and the one or more processors configured to:
   transmit demodulation reference signal (DMRS) information that indicates a first DMRS configuration for a first transmit receive point (TRP), wherein the first DMRS configuration is different from a second DMRS configuration for a second TRP;
   transmit a first set of DMRS according to the first DMRS configuration, wherein the first set of DMRS are different from a second set of DMRS transmitted according to the second DMRS configuration;
   receive at least one of a first DMRS-based channel quality report, generated based at least in part on the first set of DMRS, or a second DMRS-based channel quality report generated based at least in part on the second set of DMRS; and
   receive a joint DMRS-based channel quality report generated based at least in part on the first set of DMRS and the second set of DMRS.

* * * * *